Patented Nov. 17, 1936

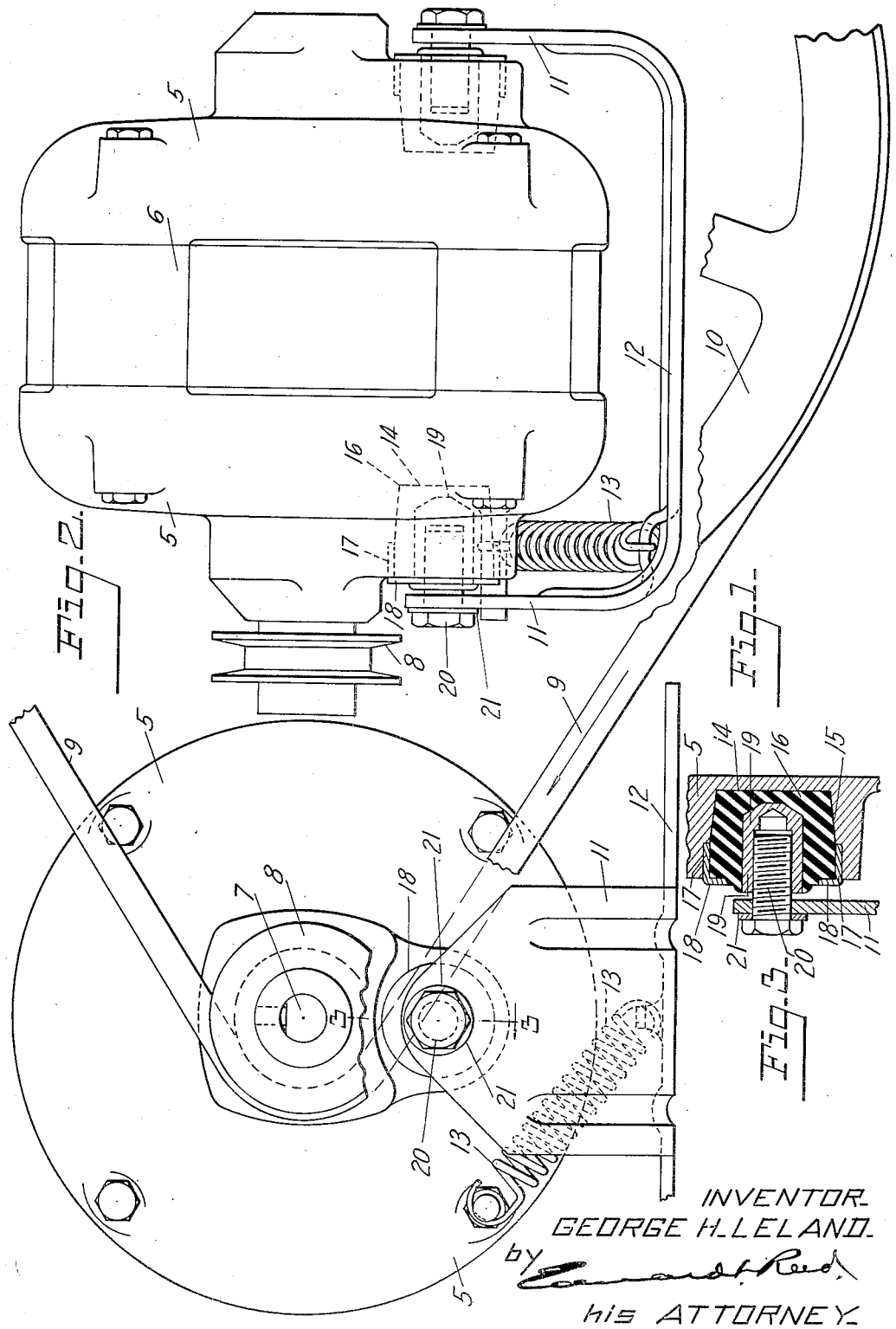

2,061,080

UNITED STATES PATENT OFFICE 2,061,080

MOUNTING FOR MOTORS AND THE LIKE

George H. Leland, Dayton, Ohio, assignor of one-half to The Leland Electric Company, Dayton, Ohio, a corporation of Ohio Application September 12, 1935, Serial No. 40,297

5 Claims. (Cl. 248—26)

This invention relates to mountings for motors and the like and one object of the invention is to so mount a belt driving motor that it will be capable of oscillatory movement which will serve to automatically maintain the belt at driving tension.

A further object of the invention is to provide a pivotal mounting for a motor, or similar device, which will permit the free oscillatory movement of the motor without rattling or other noise.

A further object of the invention is to provide such a mounting which will yieldably resist, or cushion, the transverse and axial movements of the motor.

A further object of the invention is to provide such a mounting which will be simple and inexpensive in construction and of such a character that the motor can be quickly and easily mounted on or removed from its supporting structure.

Other objects of the invention may appear as the device is described in detail.

In the accompanying drawing Fig. 1 is an end elevation, partly broken away, of a motor equipped with my invention; Fig. 2 is a side elevation of such a motor; and Fig. 3 is a section taken on the line 3—3 of Fig. 1.

In this drawing I have illustrated one embodiment of my invention and have shown the same as applied to an electric motor of the type commonly used for driving the compressor of a refrigerating apparatus. It will be understood, however, that this particular embodiment has been chosen for the purpose of illustration only and that the invention may be applied to motors or other devices of various kinds where an oscillatory movement is desired.

In the particular embodiment here illustrated the motor frame or casing is of ordinary construction and comprises the usual end members or end frames 5 which are rigidly secured to the stator 6 and in which is journaled a motor shaft 7. A belt pulley 8 is secured to one end of the shaft 7 and is connected by a belt 9 with the belt pulley 10 of the device which is to be driven, such as a compressor. The motor may be mounted on a supporting structure of any suitable kind but when, as in the present instance, it is desirable to support the motor at both ends, the supporting structure preferably comprises upright supporting members 11 arranged at the respective ends of the motor and overlapping portions of the motor frame and these supporting members may be conveniently formed integral with a base 12. The motor frame is mounted on the supporting members for oscillatory movement about an axis substantially parallel with but spaced radially from the axis of the pulley 8, which, in the present instance, is also the axis of the motor shaft. The pivotal axis is so arranged with relation to the motor frame that the movement of the frame in one direction about the pivotal axis will tend to tighten the belt 9 about the pulley 8, and to provide firm driving contact between the belt and the pulley. The pivotal axis may also be arranged so that the frame will tend to move by gravity in a belt tightening direction but, in the arrangement here shown, the pivotal axis is directly below the pulley axis and a spring 13 is connected at one end with the supporting structure and at its other end with the motor frame and tends to move the frame about its pivotal axis in a belt tightening direction.

It will be noted that the lower stretch of the belt 9 is the power transmitting portion of the belt and moves toward the pulley 8, as shown by the arrow in Fig. 1, and that power is applied thereto at its point of initial contact with the pulley. The pivotal axis of the motor frame is arranged adjacent to this point of initial contact between the belt and the pulley and consequently the application of power to the belt has little if any tendency to move the pulley in a direction to slacken the belt. In some installations the load varies periodically so that power is applied to the belt intermittently. When the full load goes on the pulley will move in a direction to tighten the belt and will be maintained in belt tightening position so long as the full load is imposed upon the pulley. When the load is reduced the pulley will move in the opposite direction and slightly slacken the belt but there is always sufficient tension in the belt to drive the belt pulley 10 of the driven device. Obviously the belt will be maintained at driving tension during the transmission of power, either intermittent or continuous, regardless of the stretching of the belt or the wear thereon.

The pivotal mounting by means of which the motor frame is connected with the supporting structure may take various forms but in many installations it is highly desirable that the motor should be substantially noiseless and it is therefore essential that the mounting should be of such a character that there will be no rattling or other noise due to the operation thereof. I have therefore provided a mounting in which one pivot member is connected with the frame through a body of yieldable material and the cooperating pivot member is rigidly mounted on one of the supporting members, the two pivot members being so connected one with the other that there cannot be sufficient movement between them to cause rattling or noise. In the particular construction here illustrated each end member 5 of the motor frame is provided with an outwardly opening recess 14 which is preferably circular in form and may, if desired, have its inner portion slightly tapered as shown at 15. Mounted within this recess is a body of yieldable material, such as a block of resilient rubber 16. This block of rubber substantially fills the recess and is so secured therein that it cannot have bodily rotatory movement with relation to the frame. In the present instance, a connecting member is secured to the block of rubber and to the wall of the recess and, as here shown, this connecting member comprises a collar 17 extending circumferentially about the rubber block and having a flange 18 which engages the outer end of the rubber block, the rubber being preferably secured to the connecting member by fusing or vulcanizing the same thereon. The collar 17 is rigidly secured to the frame member, preferably by pressing the same into the recess with a tight fit, the recess being here shown as having its outer portion enlarged to receive the collar. A pivot member 19 is embedded in the central portion of this body of yieldable material and is spaced from both the circumferential wall and the inner end wall of the recess so that a substantial portion of yieldable material is interposed between all parts of the pivot member and the walls of the recess. The pivot member is also rigidly secured to the yieldable material, as by fusing or vulcanizing the rubber thereon. In the present instance, the pivot member 19 is provided with a longitudinal bore extending inwardly from the outer end thereof, and thus constitutes a socket member which is adapted to receive a pivot stud 20 carried by the adjacent supporting member 11. The stud 20 is so mounted on the supporting member as to be held against rotatory movement with relation thereto and, in the arrangement shown, the shank of the stud is screw threaded throughout its length and it is mounted in a screw threaded aperture in the supporting member, a lock washer 21 being interposed between the head of the stud and the supporting member to hold the stud against rotatory movement, and inasmuch as the screw threads hold the stud against axial movement it will be apparent that it is rigidly secured to the supporting member and will have no movement with relation thereto. The socket member 19 is screw threaded to receive the threaded inner portion of the stud but the threads are sufficiently loose to permit the free oscillatory movement of the socket member on the stud. Consequently the socket member can have no transverse or axial movement with relation to the stud except the very short axial movement which results from the turning of the socket member on the screw threads of the stud.

It will be apparent therefore that while the socket member and the motor frame may have free oscillatory movement on the pivot stud 20, the two pivot members are so connected one to the other that they can have no relative movement which might create noise and that the stud is rigidly secured to the supporting member and has no movement with relation thereto during the operation of the device and that the body of rubber interposed between the end frame and the socket member 19 maintains these parts out of contact one with the other and absorbs any movement of the end frame, either axial or transverse, with relation to the socket member. Consequently such relative movements are cushioned and the device is absolutely noiseless in its operation.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In combination with a motor or the like comprising a frame and supporting members at the respective ends of said frame, said frame having recesses in the ends thereof, a body of yieldable material mounted in each recess, a pivot member mounted in said body of yieldable material and spaced from the wall of said recess, a pivot member secured to the adjacent supporting member and having supporting connection with the first mentioned pivot member, said connection being of such a character that said first mentioned pivot member may have oscillatory movement with relation to the last mentioned pivot member.

2. In combination with a motor or the like comprising a frame and supporting members at the respective ends of said frame, said frame having recesses in the ends thereof, a body of yieldable material mounted in each recess, a pivot member mounted in said body of yieldable material and spaced from the wall of said recess, and a pivot member secured to the adjacent supporting member and having screw threaded connection with the first mentioned pivot member.

3. In combination with a motor or the like comprising a frame, and supporting members at the respective ends of said frame, said frame having recesses in the ends thereof, a body of yieldable material mounted in each recess, a socket member embedded in each body of yieldable material and spaced from the wall of said recess, and pivot studs rigidly mounted on said supporting member and extending into the respective socket members.

4. In combination with a motor or the like comprising a frame and supporting members at the respective ends of said frame, said frame having recesses in the ends thereof, a body of yieldable material mounted in each recess and held against bodily movement therein, a socket member embedded in each body of yieldable material and spaced from the wall of said recess, and pivot studs secured to said supporting members, extending into the respective socket members and having screw threaded connection therewith.

5. In combination with a motor or the like comprising end frames, and a supporting member adjacent to each end frame, said end frames having alined recesses spaced from and substantially parallel with the axis of said motor, a body of resilient material mounted in each recess and rigidly secured to the frame member, and a socket mounted in and rigidly secured to each body of resilient material and spaced from the wall of the recess in which said body of resilient material is mounted, and a stud rigidly secured to each supporting member and having a part mounted in the adjacent socket for rotatory movement with relation thereto.

GEORGE H. LELAND.